Sept. 29, 1970  R. V. BERNIER  3,531,191
THREE DIMENSIONAL CINEMATOGRAPHY
Filed Oct. 21, 1966  12 Sheets-Sheet 1
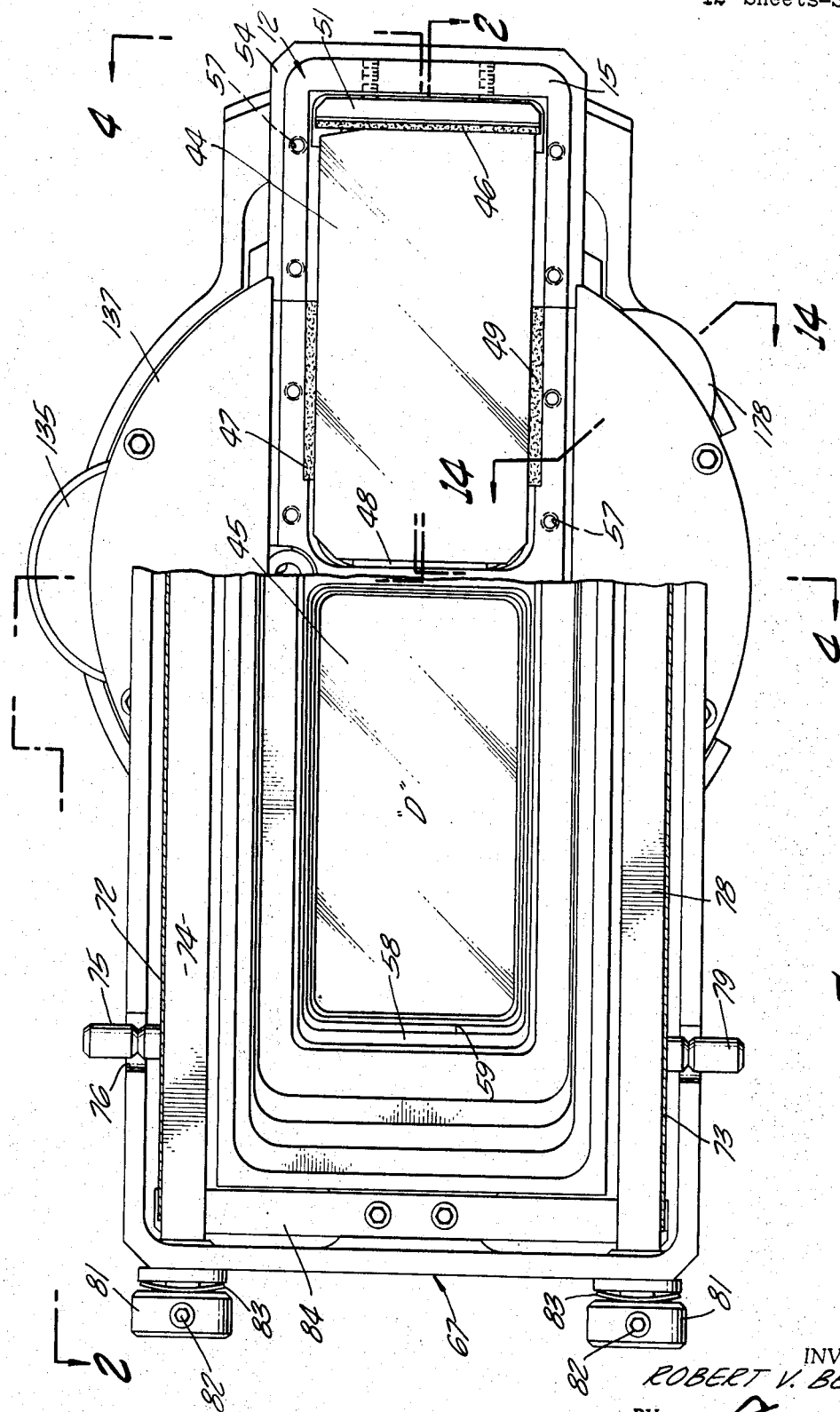
FIG. 1.
INVENTOR.
ROBERT V. BERNIER
BY
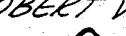
ATTORNEYS

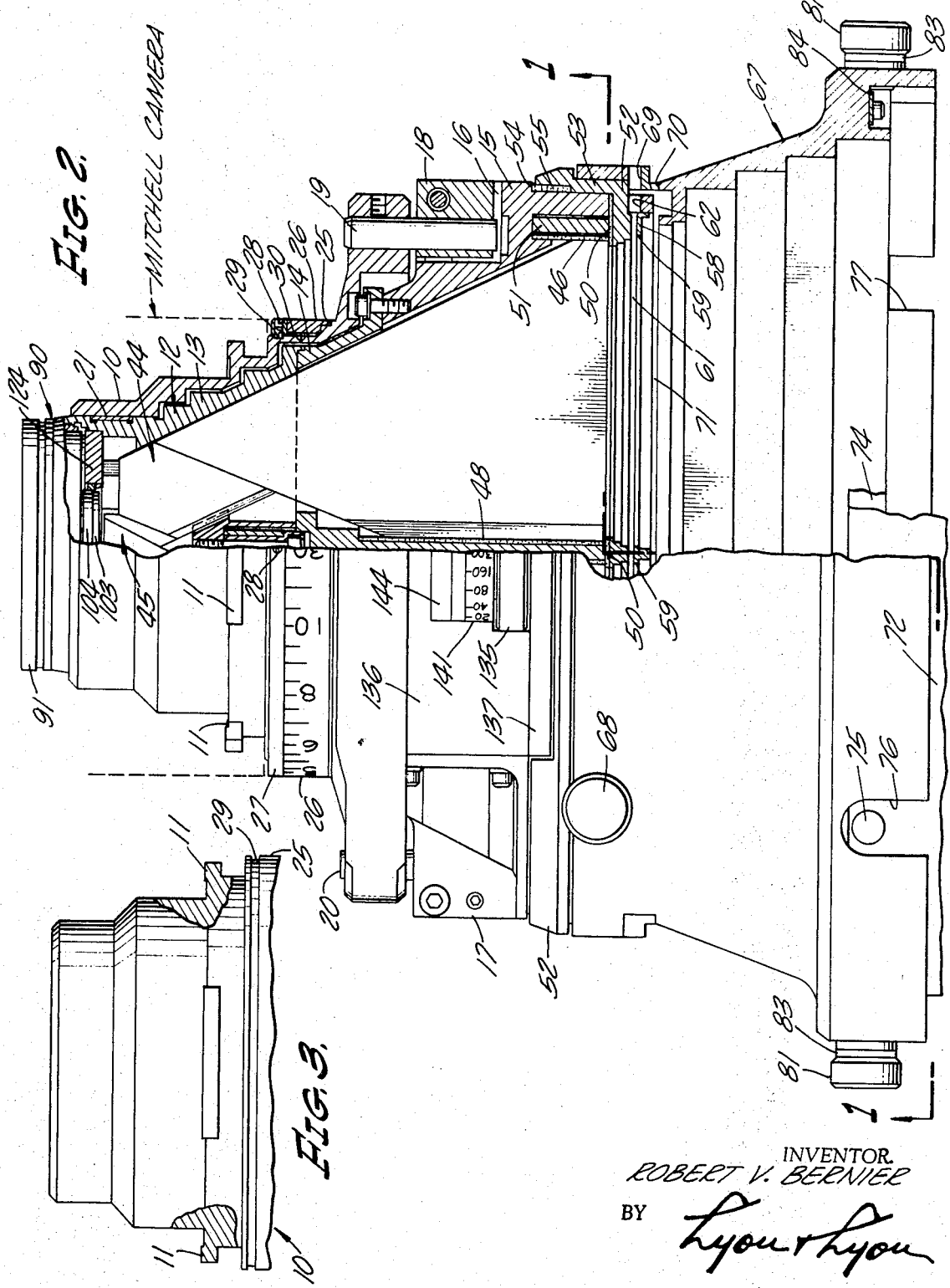

Sept. 29, 1970  R. V. BERNIER  3,531,191
THREE DIMENSIONAL CINEMATOGRAPHY
Filed Oct. 21, 1966  12 Sheets-Sheet 3
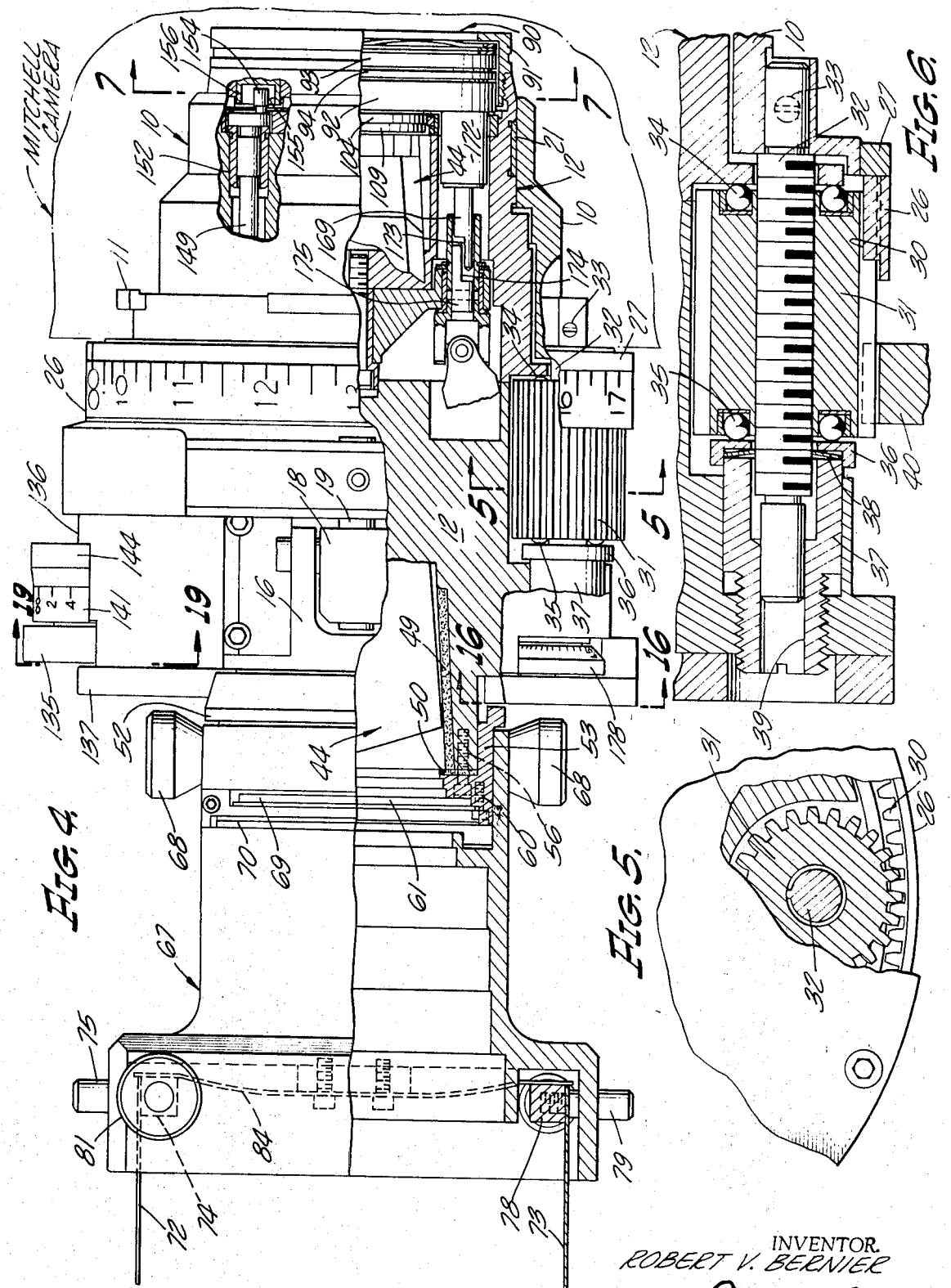
INVENTOR.
ROBERT V. BERNIER
BY Lyon & Lyon
ATTORNEYS Sept. 29, 1970  R. V. BERNIER  3,531,191
THREE DIMENSIONAL CINEMATOGRAPHY
Filed Oct. 21, 1966  12 Sheets-Sheet 4
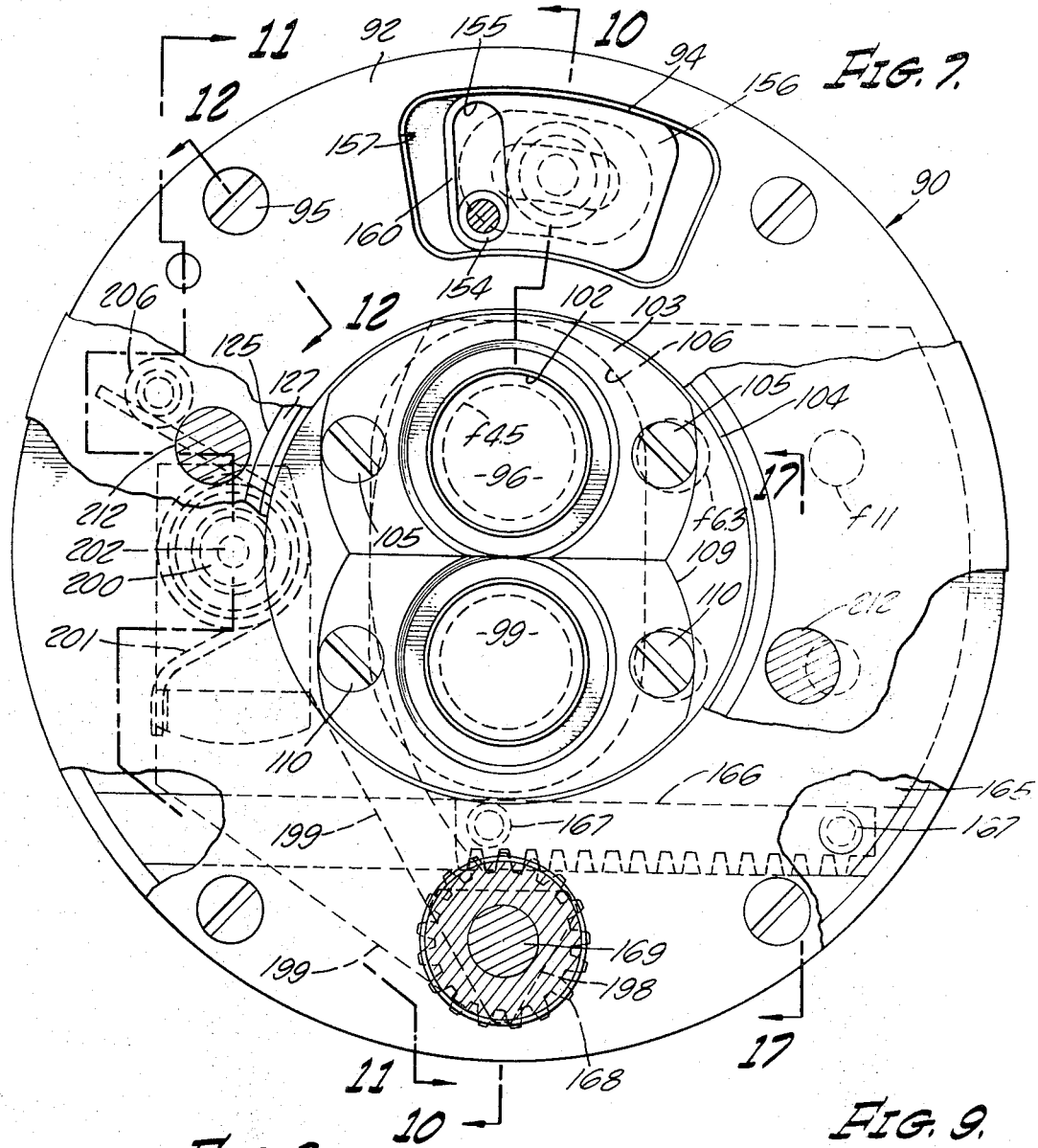
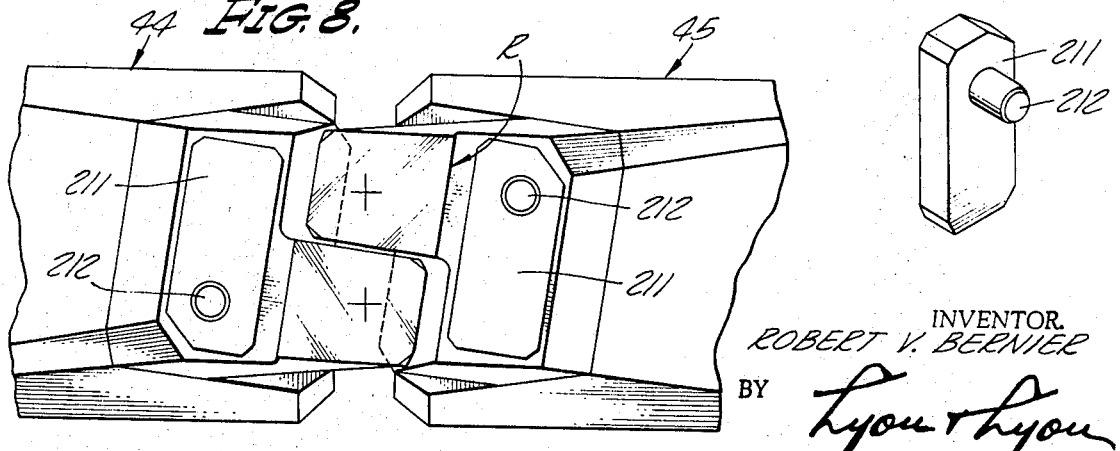
INVENTOR.
ROBERT V. BERNIER
BY Lyon & Lyon
ATTORNEYS Sept. 29, 1970     R. V. BERNIER     3,531,191

THREE DIMENSIONAL CINEMATOGRAPHY

Filed Oct. 21, 1966     12 Sheets-Sheet 5

INVENTOR.
ROBERT V. BERNIER
BY Lyon & Lyon
ATTORNEYS

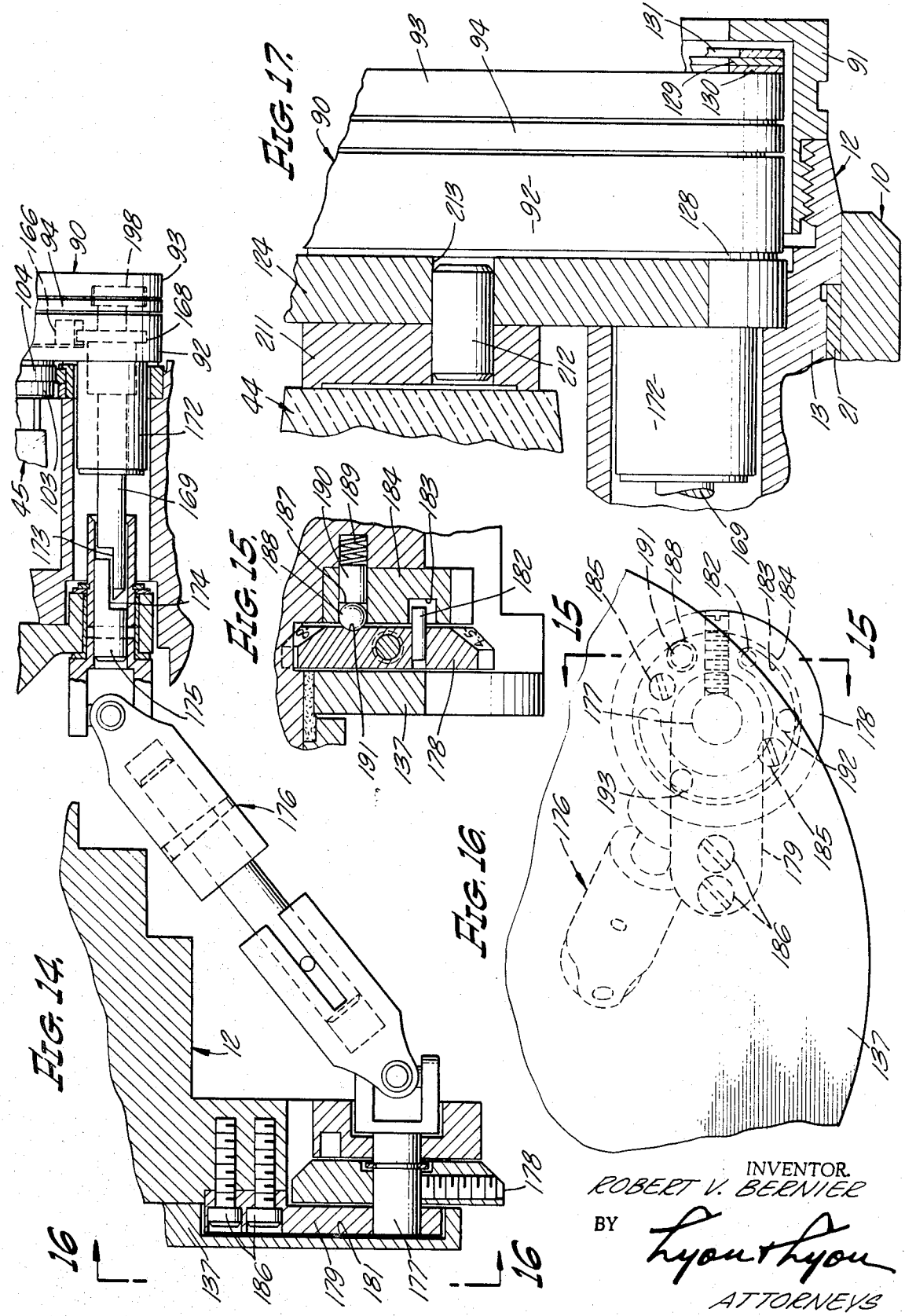

Sept. 29, 1970     R. V. BERNIER     3,531,191
THREE DIMENSIONAL CINEMATOGRAPHY
Filed Oct. 21, 1966     12 Sheets-Sheet 7
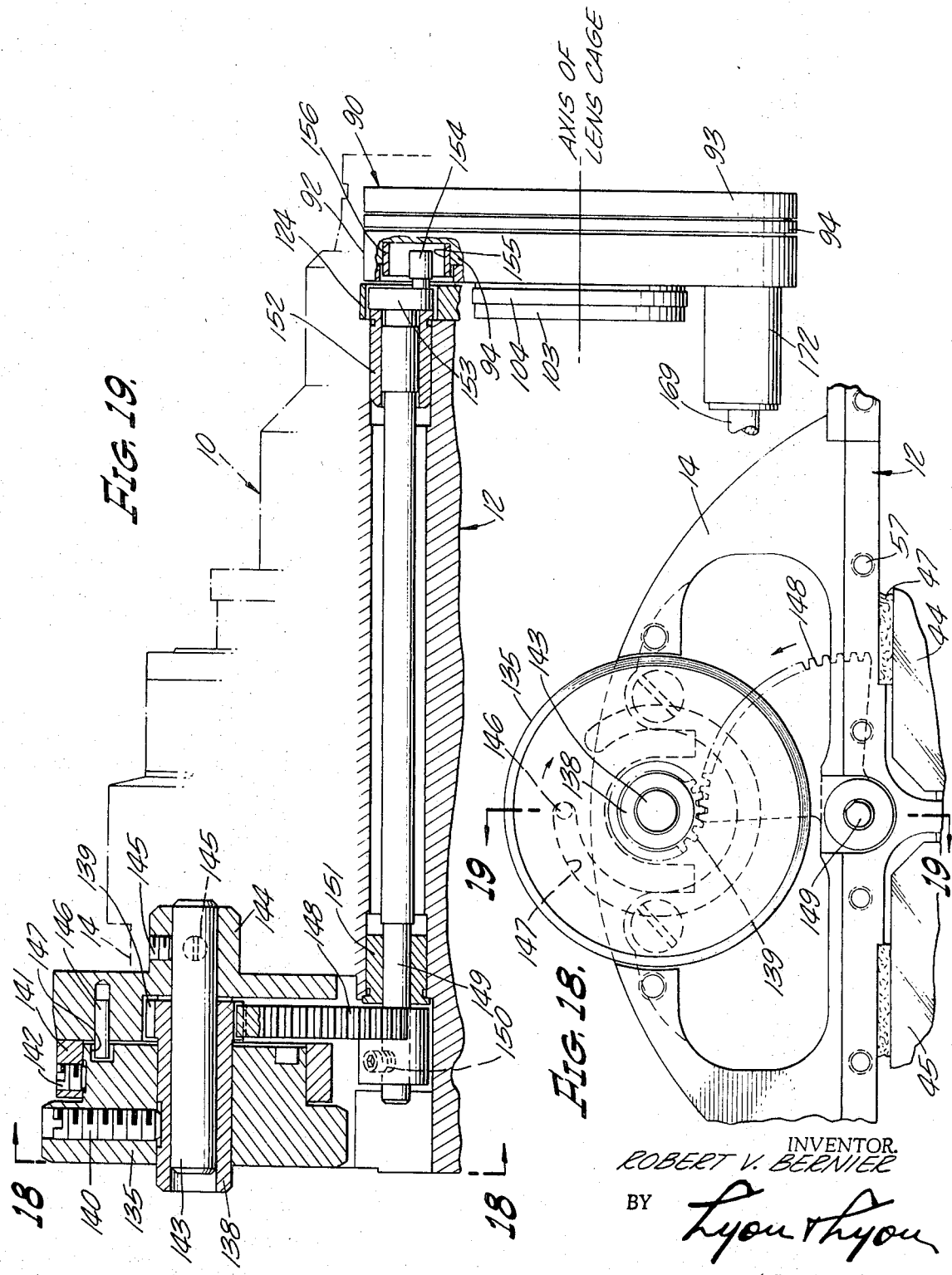
INVENTOR.
ROBERT V. BERNIER
BY
Lyon+Lyon
ATTORNEYS

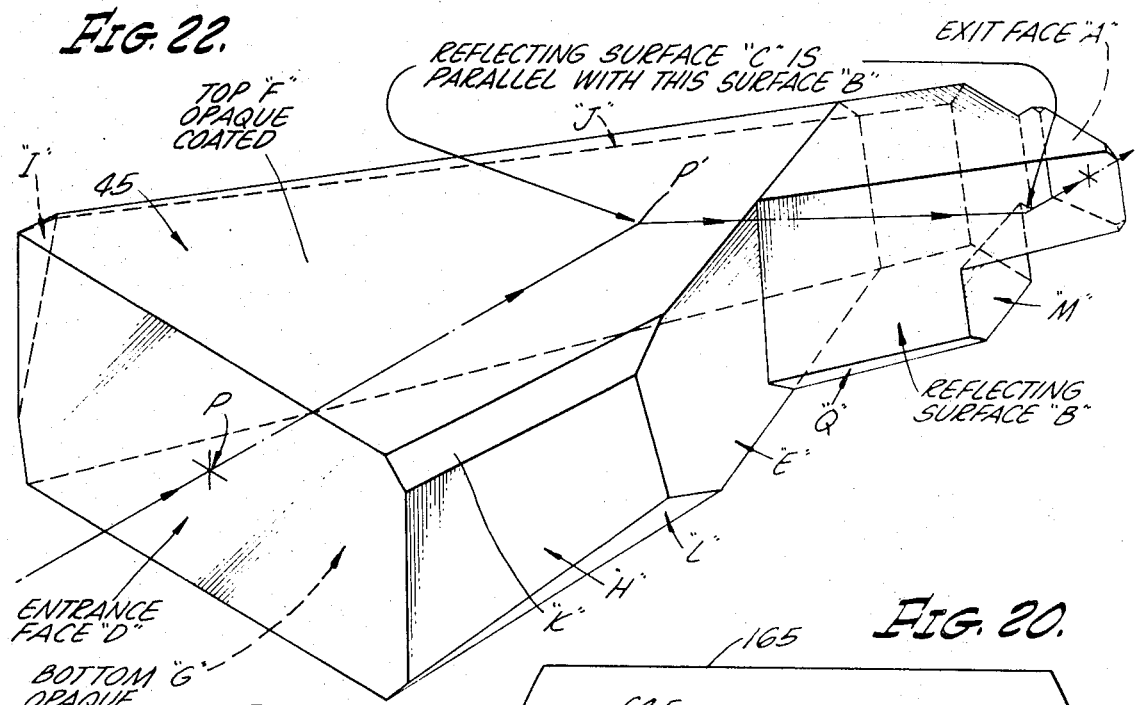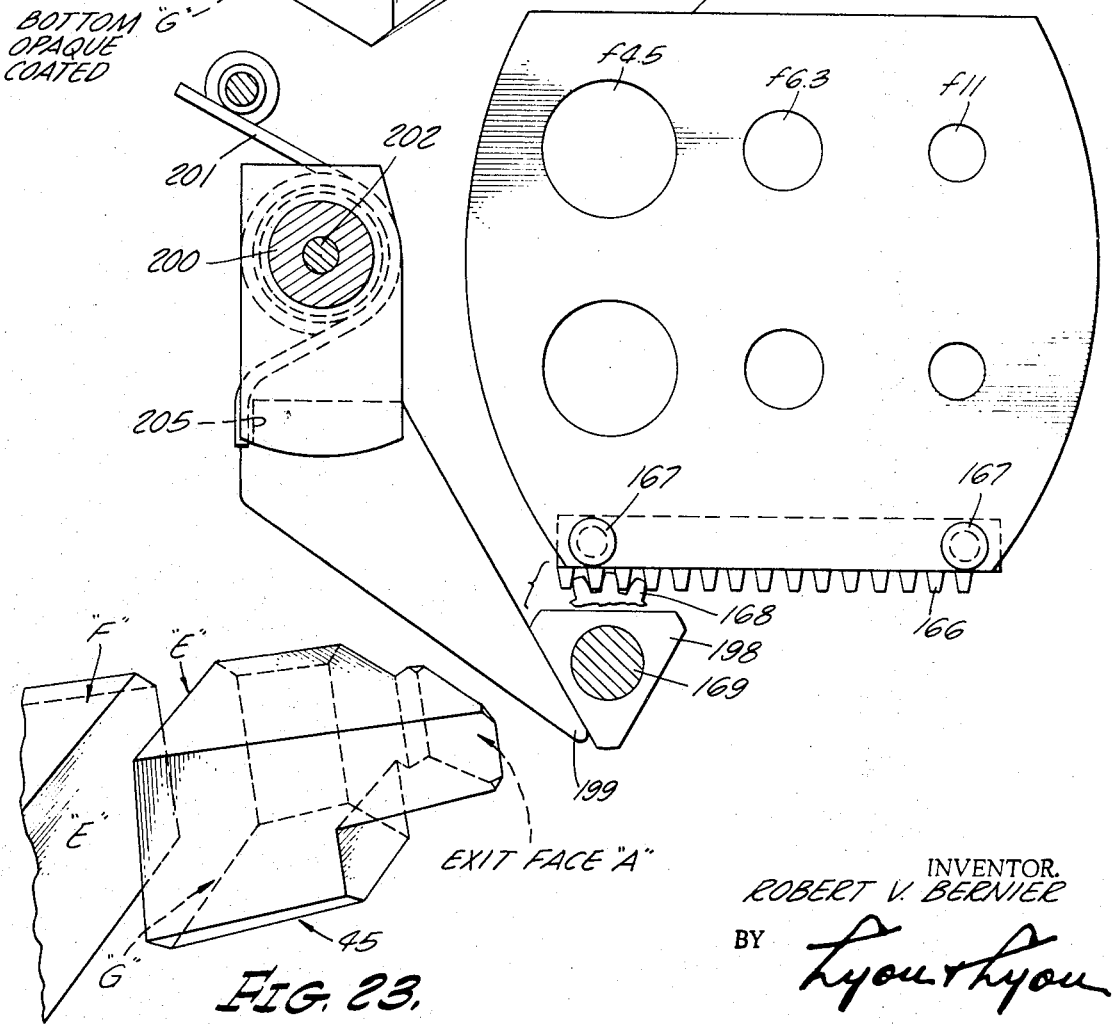

Sept. 29, 1970     R. V. BERNIER     3,531,191
THREE DIMENSIONAL CINEMATOGRAPHY
Filed Oct. 21, 1966     12 Sheets-Sheet 9
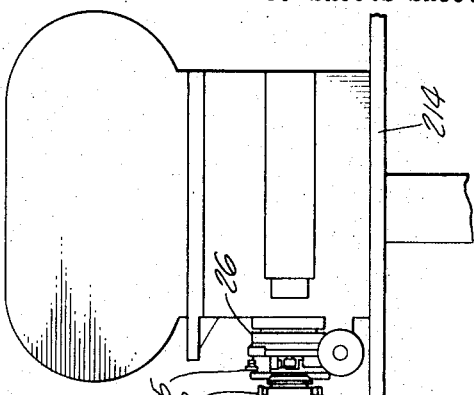
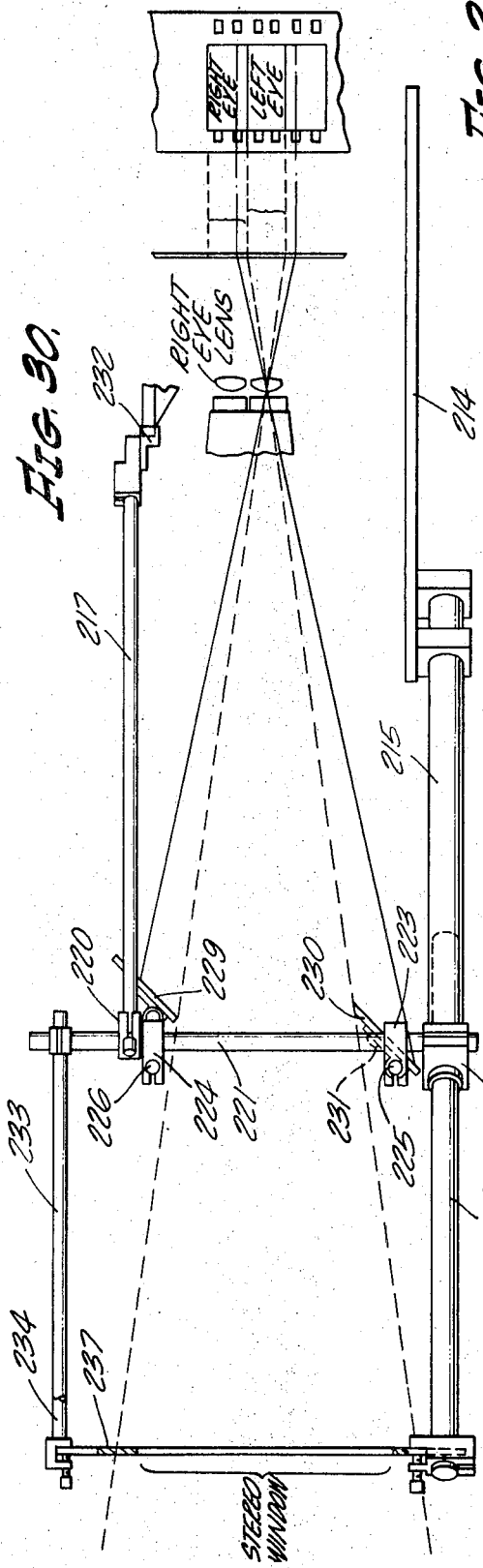
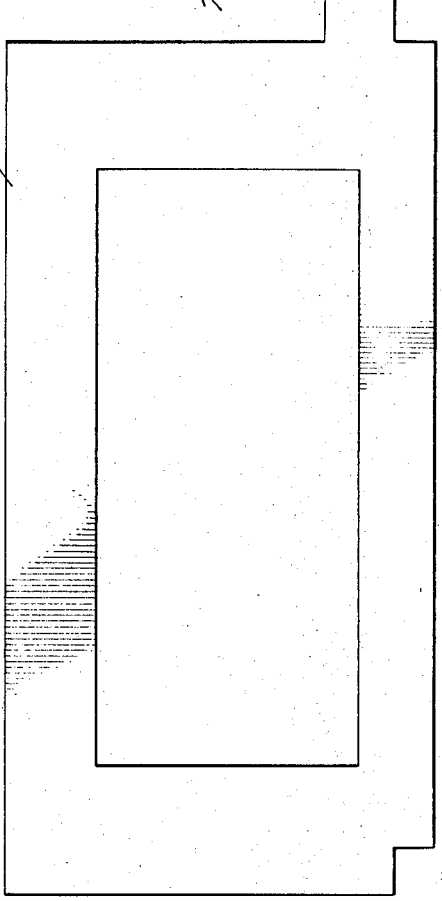
INVENTOR.
ROBERT V. BERNIER
BY
Lyon & Lyon
ATTORNEYS

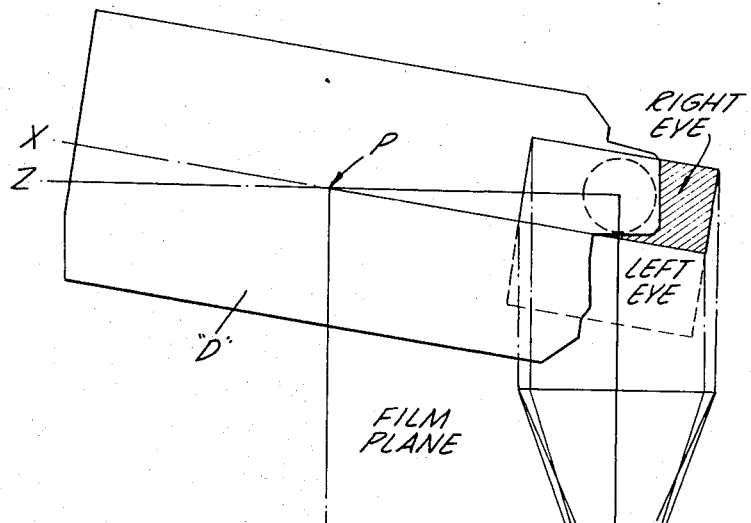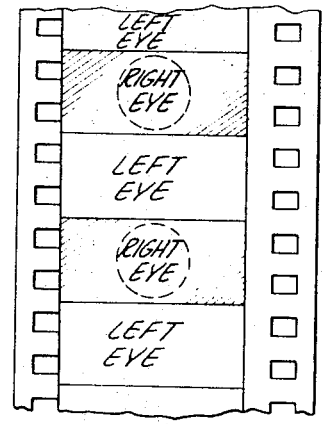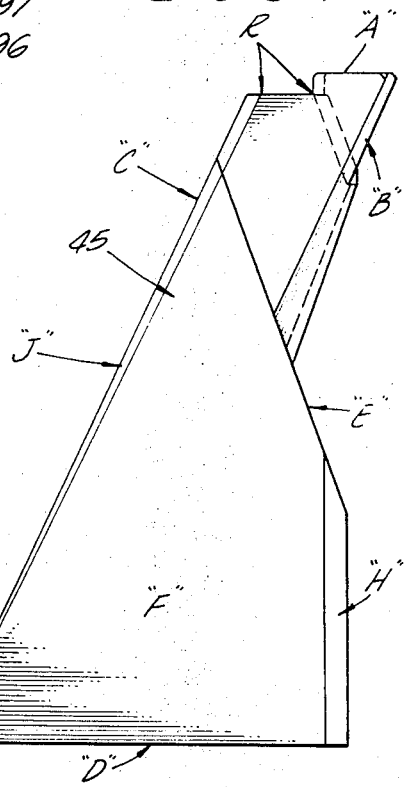

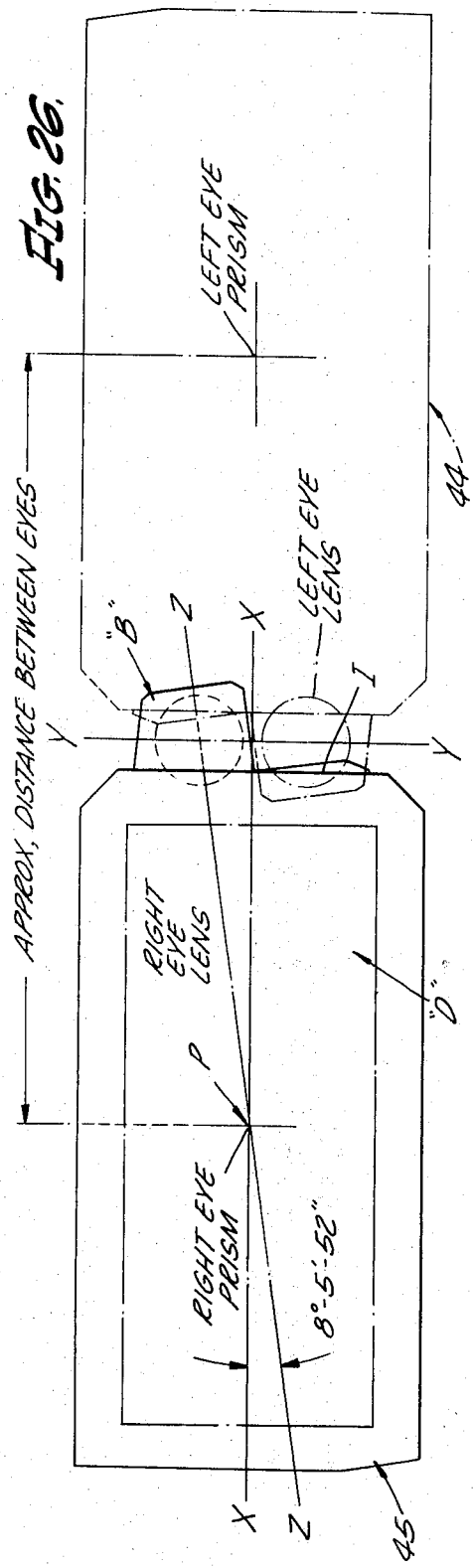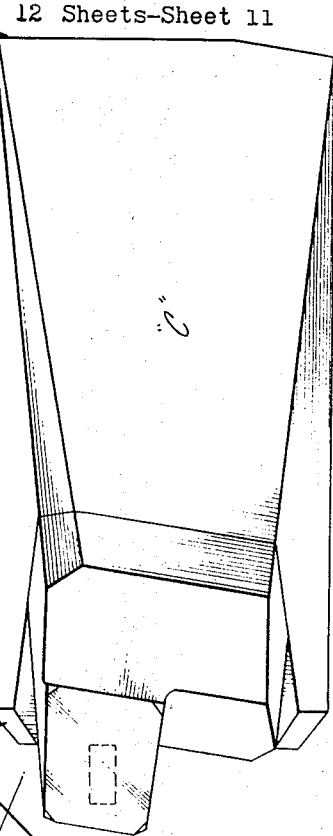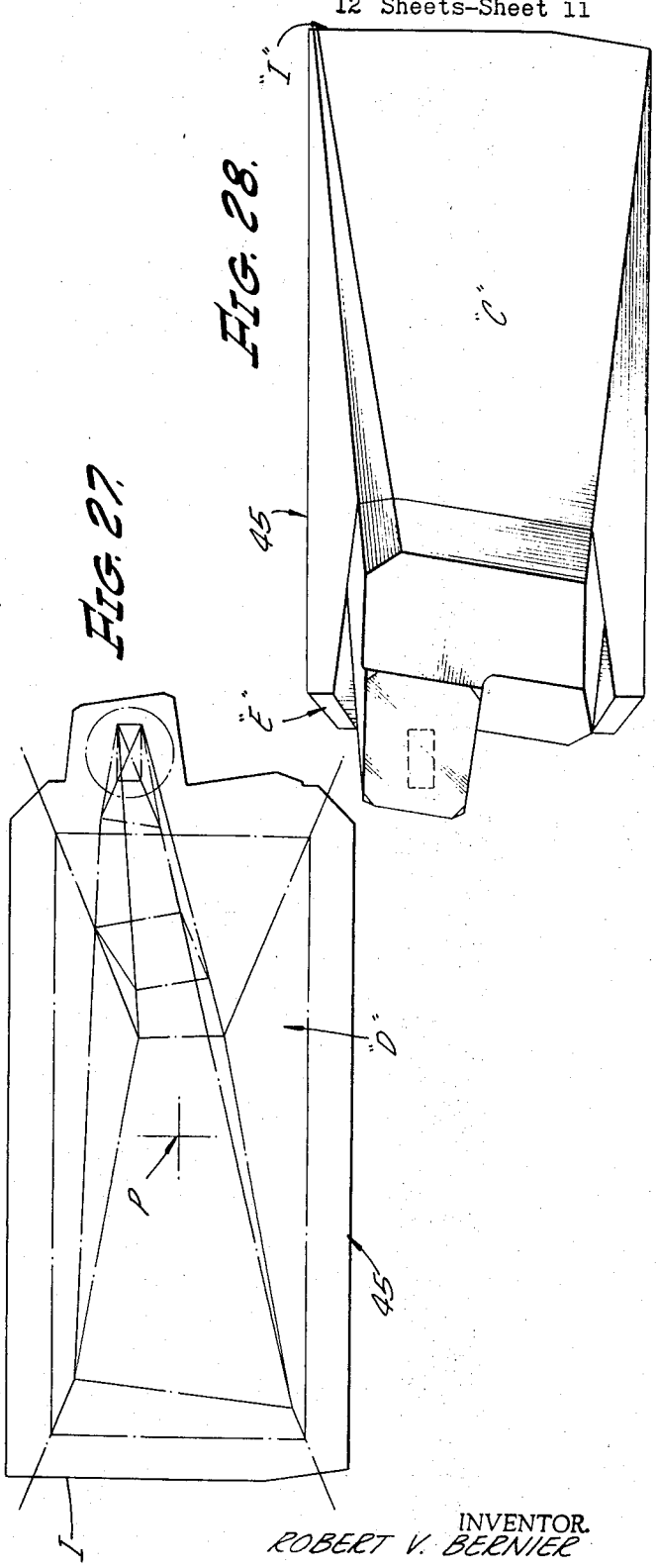

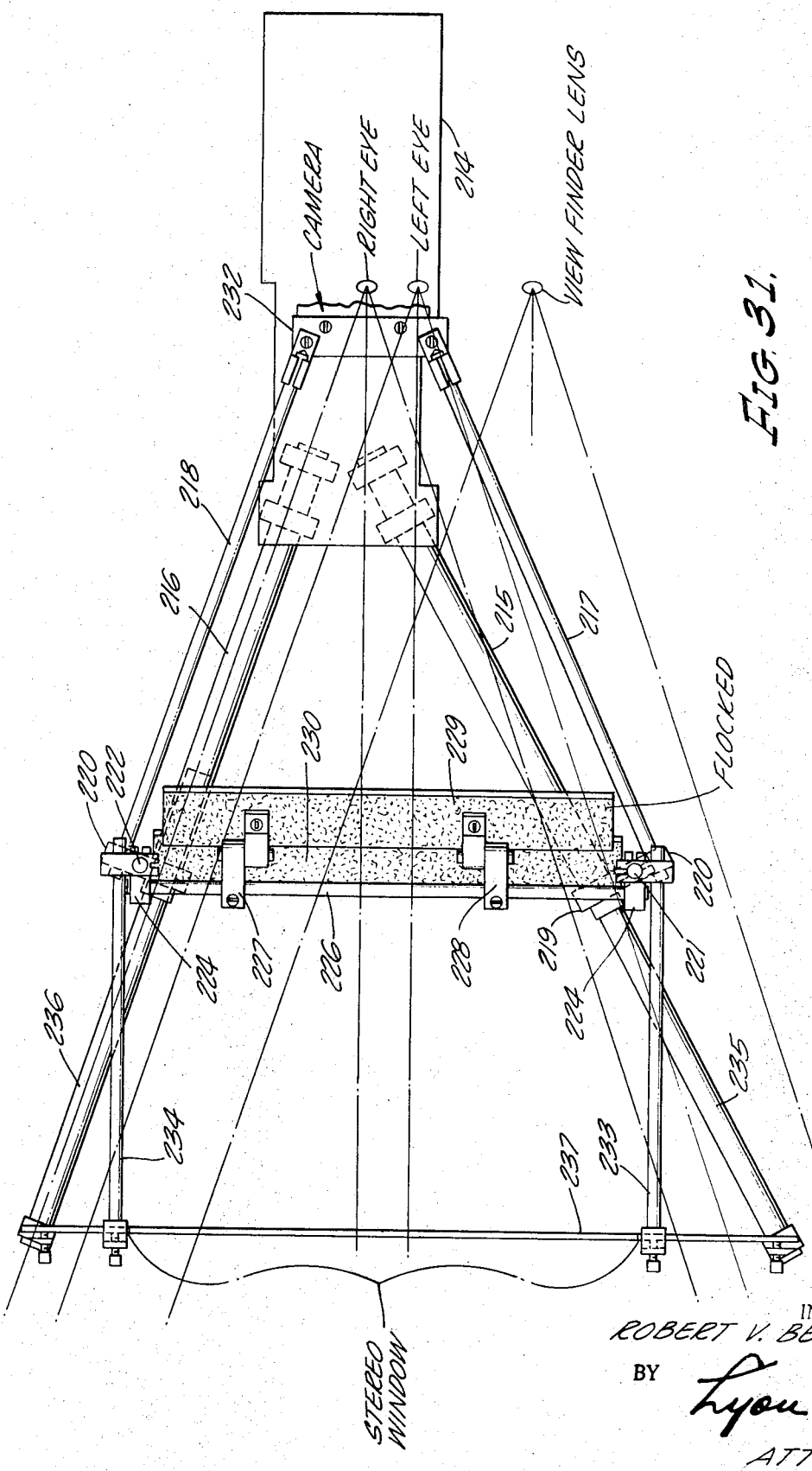

United States Patent Office 3,531,191
Patented Sept. 29, 1970

3,531,191
THREE DIMENSIONAL CINEMATOGRAPHY
Robert V. Bernier, Saugus, Calif., assignor to Tru-D Company, a corporation of California
Filed Oct. 21, 1966, Ser. No. 588,574
Int. Cl. G03b 35/10
U.S. Cl. 352—57                                    24 Claims

ABSTRACT OF THE DISCLOSURE

An attachment for a conventional motion picture camera to permit the filming of stereoscopic images on a motion picture film. Particular wide angle prisms are disclosed, as are mechanisms in the attachment for convergence and focusing control, and apparatus for establishing a clean line of demarcation and preventing fogging or confusion between the upper and lower images of a frame.

This invention relates to three-dimensional cinematography and more particularly relates to an attachment for converting a conventional motion picture camera into one capable of filming wide angle three-dimensional motion pictures on a conventional motion picture film.

While three-dimensional motion pictures have been produced in the past, the equipment used for filming them has generally been cumbersome and expensive and unfamiliar to the cameraman who must operate it. Consequently, the expense of filming the picture was substantially increased. In addition, and perhaps more importantly, the equipment previously used has introduced optical defects into the film, such as keystoning, poor registration between left and right eye images, and vertical parallax. Such defects are irritating to the viewer and have resulted in a loss of interest in three-dimensional pictures on the part of the movie-going public. It has also been difficult if not impossible with the previously known equipment to film wide angle images even though such wide angle images are highly desirable in three-dimensional photography as the stereoscopic appearance of a three-dimensional picture is essentially in the horizontal plane and is not materially affected by variation in height in the picture. Thus for a given height of the image, the stereoscopic effect is increased by an increase in the width of the image.

It is therefore an object of the present invention to provide apparatus for filming wide angle three-dimensional pictures.

It is another object of the present invention to provide such apparatus in which the left and right eye images are photographed in vertical relationship on a single film.

It is also an object of the present invention to provide such apparatus in which each stereoscopic image pair will together occupy approximately the same area of film as a single image frame of a conventional two-dimensional motion picture.

It is a further object of the present invention to provide such apparatus that is adapted for operation in connection with a conventional motion picture camera.

It is yet another object of the present invention to provide such apparatus that can be easily focused and which provides a wide range of convergence, and in which the lens diaphragm stop setting can be simply adjusted.

These and other objects and advantages of the present invention will become more apparent upon reference to the accompanying description and drawings, in which:

FIG. 1 is a front elevation view, partly broken away, taken along lines 1—1 of FIG. 2;

FIG. 2 is a top plan view, partly broken away, taken along lines 2—2 of FIG. 1;

FIG. 3 is a top plan view, partly in section, of a portion of the apparatus shown in FIG. 2;

FIG. 4 is a side elevation view, partly in section, taken along lines 4—4 of FIG. 1;

FIG. 5 is a view, partly in section, taken along lines 5—5 of FIG. 4;

FIG. 6 is an enlarged sectional detailed view of the focusing mechanism of the apparatus of the present invention;

FIG. 7 is a view, partly in section, taken along lines 7—7 of FIG. 4;

FIG. 8 is an elevation view taken along lines 8—8 of FIG. 10;

FIG. 9 is a perspective view of a prism positioning and supporting member;

FIG. 14 is an enlarged cross-sectional view taken along lines 14—14 of FIG. 1;

FIG. 15 is a cross-sectional view taken along lines 15—15 of FIG. 16;

FIG. 16 is an elevation view taken along lines 16—16 of FIG. 14;

FIG. 17 is a cross-sectional view taken along lines 17—17 of FIG. 7;

FIG. 18 is an elevation view taken along lines 18—18 of FIG. 19;

FIG. 19 is a cross-sectional view taken along lines 19—19 of FIG. 18;

FIG. 20 is an elevation view, partly in section, taken along lines 20—20 of FIG. 11 and showing the diaphragm stop setting adjustment apparatus of the present invention;

FIG. 21 is a side elevation of the apparatus of the present invention mounted on a conventional motion picture camera;

FIG. 22 is a perspective view of the right eye prism used in the apparatus of the present invention;

FIG. 23 is a perspective view of a portion of the prism shown in FIG. 22;

FIG. 24 is a view illustrating the optical paths followed by the light received in the right hand prism of the present invention;

FIG. 25 is a top plan view of the right eye prism of the present invention;

FIG. 26 is a front elevational view of the right and left eye prisms of the apparatus of the present invention;

FIG. 27 is a front elevation view of the right eye prism of the present invention showing the optical faces thereof;

FIG. 28 is a rear elevation view of the right eye prism of the present invention;

FIG. 29 is a front elevation view showing the manner in which the right and left eye images are positioned on a motion picture film;

FIG. 30 is a schematic view of a matte supporting attachment used in conjunction with the apparatus of the present invention;

FIG. 31 is a top plan view taken along lines 31—31 of FIG. 30; and

FIG. 32 is a front elevation of a stereo window attachment used in conjunction with the apparatus of the present invention.

Figure 10:
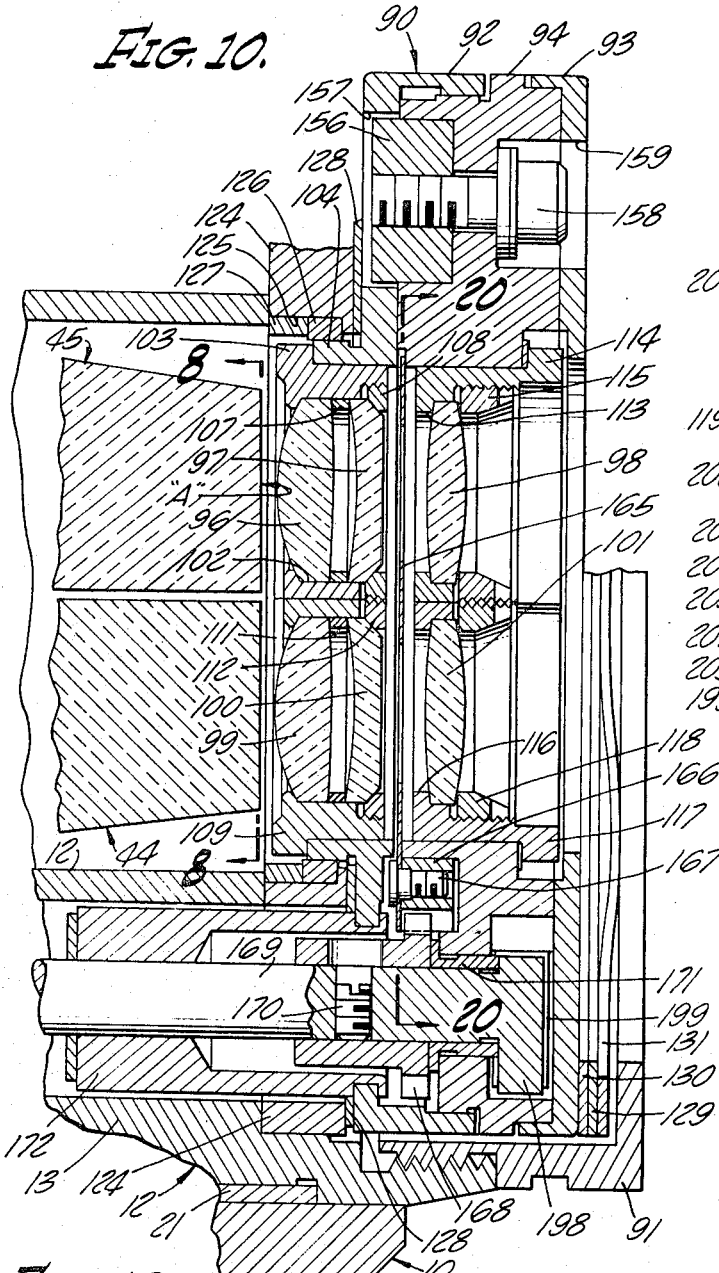
FIG. 10 is a cross-sectional view taken along lines 10—10 of FIG. 7.

Briefly, the present invention provides apparatus for attachment to a conventional motion picture camera, such as a Mitchell BNC camera, which permits the filming of stereoscopic images on a conventional motion picture film without significantly altering the manner in which the camera is operated. The present apparatus includes a pair of novel wide angle right and left eye prisms which receive right and left eye images side by side and transpose them into vertical relationship on the film such that the images have a wide angle aspect ratio of greater than one unit in height to two units in width and occupy the same area of the film normally occupied by a single frame photographed by the camera. The prisms have wide angle rectangularly shaped entrance faces for receiving image forming rays from a substantially wide angle rectangular field of view and are shaped such that all image forming rays from the two prisms are directed respectively through two vertically arranged lens systems onto the film. The lenses are supported in a separate lens housing which is rotatably mounted to the prism housing to vary the convergence of the rays from a point in infinity to a point in close proximity to the camera so that apparent motion of images toward and away from the screen can be obtained when the film is projected. Simple to operate mechanisms are provided to obtain this convergence as are mechanisms to change the lens diaphragm stop setting. A focus control is provided that may be operated manually or may be attached to and operated by the camera focus controls. Various additional attachments are also provided that cooperate to result in a single unit that is relatively simple to operate and which permits the obtaining of various special effects desirable in three-dimensional motion pictures.

The details of construction of the mechanical apparatus of the present invention are illustrated in FIGS. 1 through 21. A fixed or stationary housing 10 is provided with any suitable means, such as a banyonet joint 11, for attachment in and to the lens bore of a conventional motion picture camera. Positioned partially within the housing 10 is a prism supporting housing 12 which, in practice, is made up of a number of individual sections 13, 14, and 15, but which for convenience will be referred to by the single reference numeral 12. The prism housing 12 is provided with a pair of ears 16 and 17 on either side thereof on which are screw mounted bearing blocks only one of which, indicated at 18, is shown. The bearing blocks receive shafts 19 and 20 which are mounted on a suitable flange on the housing 10 and held in place in a suitable manner, for example by set screws. The shafts 19 and 20 serve to support the prism housing 12 and permit it to be telescoped into and out of the housing 10. The prism housing 12 is also supported by an annular thrust bearing 21 which is mounted in a peripheral groove toward the rear of the prism housing 12 and which engages the inner surface of the stationary housing 10.

For focusing purposes, the prism housing 12 may be telescoped into and out of the housing 10 by a mechanism best seen in FIGS. 4, 5 and 6. The housing 10 is provided with a shoulder 25 in which is mounted a ring 26 imprinted with appropriate focus indicia. The ring 26 is held in the shoulder 25 by a retaining ring 27 which is held in place on the housing 10 by set screws 28 which fit into a groove 29 formed in the housing 10 adjacent to the shoulder 25, as shown in FIG. 3. The ring 26 is provided internally with gear teeth 30 which cooperate with a gear 31 mounted on a threaded shaft 32. One end of the shaft 32 fits into a passageway in the housing 10 and is held in place by a set screw 33 so that when the gear 31 is rotated, it travels laterally along the shaft 32.

The gear 31 is provided at each end with ball bearings 34 and 35 which respectively engage the housing 12 and a cap 36 which is mounted on one end of a tubular member 37 which is forced into engagement with the ball bearings 35 by a spring 38. The tubular member 37 has a central passageway 39 which telescopes over the other end of the shaft 32 so that the member 37 can slide along the shaft 32. The tubular member 37 is externally threadedly engaged with a bore in the housing 12 to provide adjusting tension of the spring 38 so that when the gear 31 is rotated and moves along the threaded shaft 32, it moves the entire prism housing 12 along with it. The gear 31 can also be engaged for rotation with another gear 40 terminating the normal focus control mechanism on the camera. This permits the focus to be adjusted either manually or automatically.

Mounted within the housing 12 are a pair of prisms 44 and 45 constructed in such a manner that their exit faces are in vertical relationship although their entrance faces are in horizontal relationship, the physical centers of the entrance faces being separated from each other a distance equal to or greater than the average human interpupiliary distance. The construction of these prisms will be explained in more detail hereinafter. The prisms are mounted in the housing 12 in the identical manner and thus the details of only the prism 44 are shown. The prism is protected against vibration by a plurality of felt or cork pads 46, 47, 48 and 49 which are positioned on all sides of the prism. An additional felt or cork pad or gasket 50 is positioned around the entrance faces of the prisms for the same purpose and also acts to prevent dust or dirt from entering into the housing 12. The prism is held firmly in place by the action of a retaining plate 51 which bears against the felt pad 46 and is tightened by means of suitable screws.

Positioned over the felt gasket 50 is a face plate 52 which has a peripheral flange 53 which telescopes over the outermost end of the housing 12 and slides substantially into abutment with a shoulder 54 formed in the housing 12. A felt washer 55 is positioned between the flange 53 and the housing 12 to form a dust seal. The face plate 52 is attached to the housing 12 in any suitable fashion, for example, by means of screws 56 which pass through the face plate into threaded holes 57 in the housing 12. Positioned in front of the face plate 52 and slightly spaced therefrom is an additional plate 58 having large apertures 59 therein in front of the entrance faces of the prisms. The plate 58 is attached to the face plate 52 by screws 60 and abuts against a shoulder of the face plate such that a space 61 is left into which can be slid a suitable filter plate when such is desired. Access to the space 61 is provided by a slot 62 formed in one side of the face plate 52.

A matte box 67 is telescoped over the forward portion of the face plate 52 and held in place by screws (not shown) which, for convenience, are moved in and out by means of knobs 68. The matte box 67 has a slot 69 overlying the slot 62 in the face plate so that the filter slide can be freely pushed into place. A second slot 70 is provided in the matte box so that a dark or black slide can be inserted into the space 71 in front of the prisms 44 and 45. The matte box 67 serves to shade the entrance faces of the prisms 44 and 45 from the sun and is provided at its outer end with a pair of mattes 72 and 73 that can be closed when the camera is not in use to prevent dust and dirt from contaminating the prism faces, also the mattes are used for special effects, such as split image effects.

The matte 72 is attached to a square rod 78 by means of a pair of screws, only the screw 75 being illustrated which move into cutouts such as shown at 76 in the upper surface of the matte box 67 when the matte 72 is moved to the open position. Similarly, the matte 73 is attached to a square rod 78 by a pair of screws, only the screw 79 being illustrated. These screws fit into similar cutouts such as shown at 77 in the bottom of the matte box 67 when the matte 73 is moved to the open position.

The shaft 74 is provided at each end with a round extension which passes through a hole in the matte box 67 and has a knob 81 attached to each end thereof, for example, by means of a set screw 82. Rotation of the knob permits opening or closing the mattes. The shaft 78 is likewise povided with a knob 81 on each end. Spring washers 83 are provided adjacent each of the knobs 81 to take up slack and prevent the shafts 74 and 78 from moving laterally. In order to insure that the shafts 74 and 78, and consequently the mattes 72 and 73, are positioned either in the open or the closed position and not somewhere in between, a spring 84 is provided on either side of the matte box. The upper end of the spring 84 engages the shaft 74 and the lower end of the spring 84 engages the shaft 78. As can be seen, the spring 84 will act to urge the rods 74 and 78 to a positive stop in either the illustrated open position or in the closed position.

Figures 12, 13:
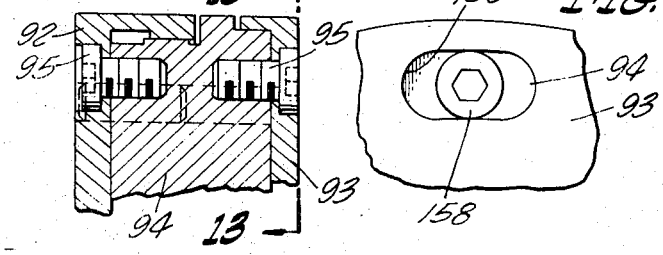
FIG. 12 is a cross-sectional view taken along lines 12—12 of FIG. 7.
FIG. 13 is an elevation view taken along lines 13—13 of FIG. 12.

A lens housing 90 is mounted in the rear portion of the housing 12 and is held in place by a cap 91 which is screw threaded onto the housing 12. As can best be seen in FIG. 10, the lens housing 90 is made up of a forward plate 92, a rear plate 93 and an intermediate plate 94, the plates being held together by suitable screws 95 as shown in FIG. 12. Construction of the lens housing in this fashion makes it easy to disassemble and clean. Mounted within the lens housing 90 are two separate lens systems, each system corresponding to one of the prisms. The uppermost lens system comprises lenses 96, 97 and 98 with the optical axis of this upper or "right eye" lens system being coincident with the axial ray exiting from the exit surface of the prism 45 and also coincident with the center of the right eye stereoscopic film frame. The lens 96 is positioned closely adjacent to the exit surface of the prism 45 so that a cone of ray bundles will be received over the full aperture of the lenses and focused on the film. The lower or "left eye" lens system is made up of lenses 99, 100 and 101 and is positioned such that its optical axis is coincident with the axial ray exiting from the exit surface of the prism 44 and with the center of the left eye stereoscopic film frame. The lens 99, like in lens 96, is positioned closely adjacent to the prism for the same purpose.

The lenses 96 and 97 are supported in a central opening 102 of a lens mounting frame 103 which telescopes into an outwardly extending flange 104 of the forward plate 92 of the lens housing 90 and is fastened to this plate 92 by screws 105 which are positioned on either side of a flange of the lens frame 103. A central aperture 106 in the rear plate 92 permits passage of the image rays to the film. As can be seen in FIG. 10, the lens 96 is inserted into the frame 103 from the rear and is held in place by a spacer ring 107. The lens 97 is then inserted and a threaded ring 108 is then screwed into place to hold the lenses in position.

In a similar manner, the lenses 99 and 100 are supported in a frame 109 which is fastened to the forward plate 92 by screws 110. The lenses 99 and 100 are separated by spacer ring 111 and held in position by threaded ring 112.

The lens 98 is positioned in the central aperture 113 of a frame 114 that telescopes into the intermediate plate 94 of the housing 90 and is fastened thereto also by screws in a suitable manner. The lens 98 is held in place by a threaded ring 115 which is screwed into place behind it. The lens 101 is mounted in the central aperture 116 of a frame 117 which is also telescoped into and fastened to the intermediate plate 94 of the housing 90. The lens 101 is held in place by the threaded ring 118.

In order to vary the convergence of the axial rays from a point at infinity to a point in close proximity with the camera, the lens housing 90 is rotatably mounted on the housing 12 so that the images are caused to be displaced on the film, convergence therefore occurring at different planes. This rotatable mounting is accomplished by mounting a plate 124 in a shoulder in the housing 12, the plate 124 having a central passageway 125 in which is positioned a frictionless bushing 126 which is held in place by a retainer ring 127. The flange 104 of the forward plate 92 of the lens housing 90 engages this bushing 126 and slidably moves thereon. Additional frictionless washers 128, 129 and 130 are provided for insuring smooth movement of the lens housing 90. The frictionless washers 129 and 130 are held in place by a spring washer 131 which bears against the cap 91 and forces the housing 90 forward.

Rotation of the housing 90 is controlled by the dial 135 mounted in a milled opening in the top of the housing 14 and which is provided with a face plate 137. As can best be seen in FIGS. 18 and 19, the dial 135 is mounted on a tubular member 138 having a gear 139 formed on the inner end thereof. The dial 135 may be fastened to the tubular member 138 in any suitable fashion, for example, by means of one or more screws 140. The dial is provided with a band 141 on which is printed suitable indicia, the band 141 being held in place by one or more screws 142. The tubular member 138 is rotatably mounted on a shaft 143 which is fixedly mounted in a member 144 by suitable screws 145. The member 144 protrudes above the surface of the housing 14 to protect the dial 135 and is provided with a pin 146 which cooperates with a groove 147 formed in the dial 135 and which serves to limit the rotation of the dial 135.

The gear 139 cooperates with a gear segment 148 mounted on a shaft 149 by means of a set screw 150. The shaft 149 is journaled in bearings 151 and 152 and terminates in a collar 153 on which is eccentrically mounted a pin or tenon 154. The eccentrically mounted pin or tenon 154 fits into a slot 155 formed in a block 156 mounted in the intermediate plate 94 of the lens housing 90, access to the block 156 being by means of an aperture 157 formed in the forward plate 92 of the housing 90. Block 156 is attached to the plate 94 by means of a screw 158 which is inserted through an aperture 159 formed in the rear plate 93 of the housing 90. The slot 155 in the block 156 is bounded on one side by a thin, springlike wall 160 and the tenon 154 is made slightly larger in diameter than the width of the slot 155 so that there will be no play between the tenon and the block.

As can be seen, when the dial 135 is turned by the operator, it causes a rotation of the gear 139 and a corresponding rotation of the gear segment 148. As a result of rotation of the gear segment 148, the shaft 149 rotates as does the collar 153. Rotation of the collar 153 causes a sideways movement of the eccentrically mounted tenon 154 which bears against the sides of the slot 155 in block 156. Movement of the tenon 154 thus causes movement of the block 156 and consequently of the whole lens housing 90.

An aperture plate 165 is positioned between the lenses 97 and 98 and between the lenses 100 and 101 and is provided with three sets of openings for establishing apertures of f4.5, f6.3, and f11. The aperture plate 165 is mounted on a rack gear 166 by screws 167. The rack 166 cooperates with a pinion 168 which is mounted on a shaft 169 by one or more set screws 170. The shaft 169 is supported by a bushing 171 mounted in the intermediate plate 94 of the lens housing 90 and extends through a tubular extension 172 of the forward plate 92 of housing 90. As can best be seen in FIG. 14, the shaft 169 is provided with a shoulder 173 at its outer end which cooperates with a similar shoulder 174 formed in a shaft 175 which is driven by a conventional universal drive, indicated generally as 176.

The other end of the universal drive 176 is coupled to a shaft 177 on which is fixedly mounted a dial 178 having indicia thereon to indicate the diaphragm stop setting. The shaft 177 is supported by an arm 179 which is bolted by bolts 186 to a portion of the housing 12 and which is covered by the plate 137 which is provided with a cutout portion 181 for this purpose. The dial 178 is provided with a pin 182 which cooperates with a groove 183 formed in a plate 184 to guide the movement of the dial 178. The plate 184 is fastened to the housing 12 by screws 185. The plate 184 is also provided with a passageway 187 in which is positioned a ball 188, the ball 188 being forced toward the dial 178 by a coil spring 189 and a slider 190. The dial 178 is provided with three depressions 191, 192 and 193 for receiving the ball 188 when the dial is turned, the detent mechanism thus formed holding the dial in place at the desired stop setting.

Figure 11:
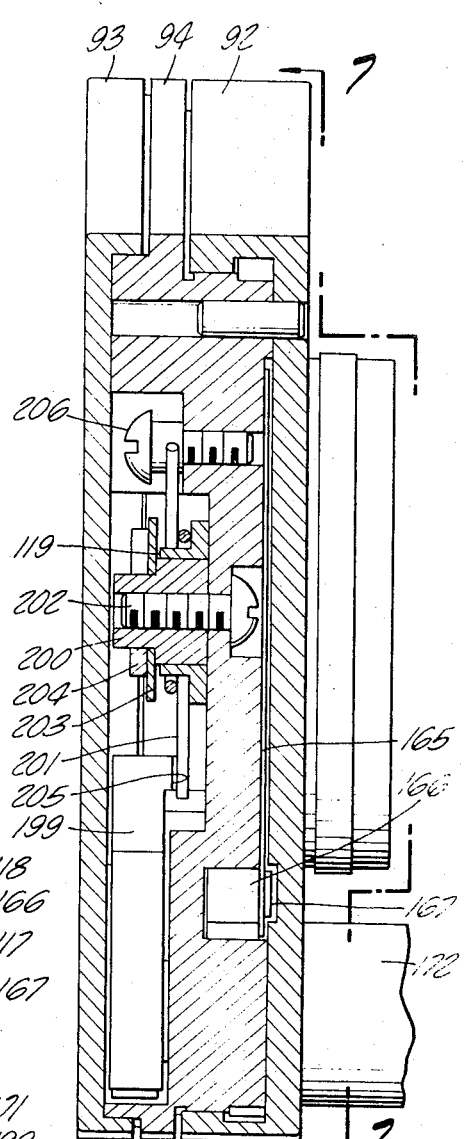
FIG. 11 is a cross-sectional view taken along lines 11—11 of FIG. 7.

Rotation of the dial 178, of course, causes the rotation of the shaft 169 through the universal drive 176 with the result that the pinion gear 168 is rotated and the rack 166 and the diaphragm plate 165 are moved normally to the axes of the lens systems so that the desired set of openings in the plate 165 are moved into position between the lenses. As can be seen from FIG. 14, the connection between the shafts 169 and 175 is very loose. This is desirable because the whole lens housing 90 must rotate approximately 9° as mentioned previously in connection with the convergence control and also because such a loose coupling makes it very easy to reassemble the mechanism if the lens housing must be removed for cleaning, changing of lenses or the like. However, since the openings in the plate 165 must be accurately positioned, means are provided for insuring that this takes place. The shaft 169 is provided at its inner end with a triangular plate 198 which cooperates with a plate 199 pivotally mounted on a post 200. A spring 201 urges the plate 199 in the counterclockwise direction against the triangular block 198. As can be seen in FIG. 11, the post 200 is mounted on the intermediate plate 94 of the housing 90 by means of a screw 202 and the plate 199 is held in place by a washer 203 and a tension retainer 204. One end of the spring 201 fits into a notch 205 formed in the plate 199 while the other end of the spring bears against the screw 206 mounted on the plate 94.

As has been previously described, when the dial 178 is rotated, the universal drive 176 will cause rotation of the shaft 175 and consequently of the shaft 169. However, because of the loose connection between the shafts 175 and 169, rotation of the dial 179 from one stop setting to the next will not completely move the aperture plate 165 from one position to the next. It will however, cause the shaft 169 to be rotated sufficiently to move the triangular plate 198 against the force of the spring 201 bearing on the plate 199 past the central position. The plate 199 will then act as a camming surface and under the force of the spring 201 will complete the movement of the triangular plate 198 until its next flat side is abutting the plate 199. This will cause additional movement of the rack 166 and aperture plate 165 and will accurately position the aperture plate 165 with relation to the lenses.

Turning now to FIGS. 22 through 28 and 33, there is shown the structural details of the prisms used in the apparatus of the present invention. These two prisms, that is, the right eye prism and the left eye prism, are identical and are positioned oppositely to each other so that the entrance face of the right eye prism receives rays from the field of view and transmits them backwardly and upwardly so that they are focused on the upper half of a frame of conventional film while the entrance face of the left eye prism receives rays from the field of view and transmits it backwardly and downwardly so that the rays are focused on the lower portion of the film frame. The manner in which the images are focused is shown in FIG. 29, the two images taking up the same space on a film as does a single frame of a conventional motion picture. The left and right eye images on a 35 mm. film will thus each occupy a space equal to two perforations, that is, 0.375 inch in height and 0.868 inch in width. The projected image will thus have a wide screen format of an aspect ratio of 1 to 2.27.

Since the construction of the prisms 44 and 45 is identical, only the structure of the prism 45 will be discussed in detail. In constructing the prims, the exit face A is first constructed perpendicular to the axis of the upper lens system 96, 97, 98 and as close to the vertex of the first element as practical. Next, the reflecting surface B of the prism is constructed to intersect the axis 210 of the lens system at an angle of 25° and to intersect exit face A along a line perpendicular to the paper bearing FIG. 24 and 0.1875 inch from the lens axis 210. The reflecting surface C is then constructed to lay parallel to surface B and at a distance measured perpendicularly between the two of 0.7343 inch. The entrance face D is then constructed parallel to the exit face A and at a distance of 4.125 inches, such that is intersection with the reflecting surface C will not obstruct any of the chief rays, nor their respective pencils of parallel rays which will need to enter over the full area of the entrance pupil of the lens and will be required to form an evenly exposed image over the full area of the 0.375 inch by 0.868 inch film frame.

Next, the prism is divided to provide for the common cemented surface E. In practice the two elements of the prism are made separately and then cemented together. The intersections of surface E with both surfaces B and C is along lines parallel with the line forming the intersection of face A and surface B. The division of the prism is necessary because of the need for a larger entrance face than would otherwise result if surface B was allowed to extend the full distance to intersect the entrance face D. Next, the prism is rotated so that the vertical plane Y containing both upper and lower lens axes is rotated to a position where a horizontal plane X, perpendicular to the vertical plane Y and parellel to and centered between the two lens axes, will intersect and contain the axial ray P of the system from a point at infinity until it reflects from the first reflecting surface C at the point P'. The plane containing the full path of the axial ray from infinity to the film is designated plane Z. The axial ray, therefore, is common to both plane X and plane Z only along the line from infinity to the point P' on face C where the first reflection occurs. The angle between plane X and plane Z should be 8°5′52″.

Further shaping of the prism is done for mechanical convenience to eliminate unused portions of the glass and permit the prisms to be mounted with their front or entrance faces in horizontal alignment in the confined space of the housing 10 which in turn must fit in a standard motion picture camera lens opening. The sides F and G guide the vertical positioning of the prism in the mount and are ground symmetrical to plane X with each side having a taper of approximately 3°. Side H is ground parallel to plane Y and serves as the primary mounting face. Side I is ground parallel to side H and is a small triangular flat area against which the felt pad 46 is clamped to force the side H against the pad 48 in parallelism with plane Y. The tapered bevel J and the bevels K, L, and Q are necessary because of the limited space in the mount. The cutaway portion of the apex between the exit face A and the reflecting surface B forming side M is required to permit the overlap of the apexes when the two prisms are mounted together as shown in FIG. 26. The relief R at the exit face A is provided to contain a cemented mounting bracket 211 which is provided with a peg 212 which fits into a locator hole 213 in the plate 124 to assure accurate location of the exit face of the prism with relation to the lenses.

The faces G and F of the prisms must be coated with an opaque non-reflecting paint to prevent the respective objective lenses from fogging each other's image area since it is impractical to position a dividing plate between the objective lenses extending from the prisms to the film since in a motion picture camera a shutter must operate in this area. The paint used on the prisms must have an index of refraction substantially equal to that of the prism to prevent double exposure.

In order to provide a clean horizontal frame line on the film differentiating between the upper right eye frame and the lower left eye frame and preventing fogging, a mask device should be used with the apparatus so far described to limit the field of coverage of both the right and left eye objective lenses to just that which will provide a half frame height equal to two perforations on the film or approximately 0.375 inch. The matter in which this mask device is constructed is shown schematically in FIGS. 30 and 31. The mask device is most conveniently mounted on a support platform 214 which is subsequently bolted to the camera and on the camera itself and consists of a pair of lower support arms 215 and 216 and a pair of upper support arms 217 and 218. These arms are connected by suitable brackets 219 and 220 to vertical arms 221 and 222 which in turn are connected by brackets 223 and 224 to horizontal bars 225 and 226. Hinges 227 and 228 are provided on the upper horizontal arm 226 to support an upper matte 229 while a lower matte 230 is mounted on brackets 231 which are rotatably mounted on the horizontal shaft 225. The inner ends of the upper support arms 217 and 218 are conveniently connected to a plate 232 which is mounted on top of the camera.

The upper and lower mattes 229 and 230 are adjusted prior to use of the camera so that they limit the field of coverage of both the right and left eye objective lenses to just the right height. When the camera is operated, portions of the mattes 229 and 230 will actually be photographed but since the negative of black is white there is no exposure on the adjacent half of the film frame and thus a clean line of demarcation is kept between the two images.

If desired, additional framing can be provided to support additional mattes or other special effect devices. As shown in FIGS. 30 and 31, such framing can simply consist of additional support arms 233, 234, 235 and 236 extending outwardly from the framework provided to support the upper and lower mattes 229 and 230. The outer ends of the arms 233–236 can be provided with suitable brackets for holding various devices, such as the stereo window 237 shown in FIG. 32. As is well known, such a stereo window is used to limit and frame the field of view for close up shots.

From the foregoing description it can be seen that apparatus has been provided that can be very simply mounted on an existing motion picture camera for converting that camera into one capable of recording three-dimensional image pairs on conventional motion picture film. The apparatus is easy to operate and is easy to assemble and disassemble for cleaning or other purposes. The apparatus, and particularly the prisms provided therein, permit the filming of wide angle images which greatly enhance the stereoscopic appearance of the picture when it is projected.

The invention may be embodied in other specific forms not departing from the spirit or central characteristics therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for photographing on a film in vertical juxtaposition simulated right and left eye images of a field of view comprising:
    first and second wide angle prisms each having an entrance face and an exit face;
    said first prism having a first reflecting surface for receiving rays from said entrance face and transmitting them backwardly and upwardly and a second reflecting surface for receiving rays from said first reflecting surface and transmitting them backwardly through said exit face;
    said second prism having a first reflecting surface for receiving rays from said entrance face and transmitting them backwardly and downwardly and a second reflecting surface for receiving rays from said first reflecting surface and transmitting them backwardly through said exit face; and
    said first prism having a shoulder formed therein under said second reflecting surface and said second prism having a shoulder formed therein over said second reflecting surface, said shoulders abutting to position said exit faces of said prisms one above the other and the entrance faces of said prisms side-by-side horizontally.

2. The apparatus of claim 1 wherein the second reflecting surface of each of said prisms is parallel with the first reflecting surface thereof but does not intersect the entrance face thereof.

3. The apparatus of claim 2 wherein said entrance and exit face of each of said prisms are parallel, said first reflecting surface makes an angle of substantially 65° with said entrance face and said second reflecting surface makes an angle of substantially 65° with said exit face.

4. The apparatus of claim 2 wherein said first and second prisms are substantially identical, said second prism being inverted relative to said first prism whereby said shoulders can be brought into abutment.

5. The apparatus of claim 4 wherein in each of said prisms the exit face is perpendicular to the axis of said rays, said second reflecting surface intersects said exit face at an angle such that substantially all rays transmitted to said second reflecting surface are reflected through said exit face, said second surface terminating in a third surface diverging therefrom; the first reflecting surface intersects said entrance face at an angle such that substantially all rays passing through said entrance face are reflected by said first surface toward said second surface, the distance between said first and second surfaces being sufficient to insure that substantially all rays reflected by said first surface are reflected onto said second surface.

6. The apparatus of claim 5 wherein said first and second surfaces are at an angle with the vertical so that the plane containing the axial ray passing from the first to the second surface is at an angle with the horizontal plane whereby vertical as well as horizontal deflection of said rays is obtained.

7. The apparatus of claim 6 wherein said third surface is joined to said entrance face by a fourth surface, said fourth surface being vertical so that said entrance faces of said first and second prisms can be arranged in side-by-side horizontal relationship.

8. The apparatus of claim 7 wherein said third surface of each prism beyond its intersection with said second surface is located with opaque, non-reflecting material.

9. The apparatus of claim 6 wherein said second reflecting surface intersects said exit face at an angle of substantially 65° and at a distance of 0.1875 inch from the axis of said rays passing through said exit face, said first reflecting surface is at a distance of 0.7343 inch from said second reflecting surface measured perpendicularly therefrom, said entrance face is perpendicular to said exit face and spaced 4.125 inches therefrom, and said plane containing said axial ray is at an angle with the horizontal plane of 8°5'52".

10. The apparatus of claim 5 wherein each of said prisms is divided into two parts along said third surface, said parts being cemented together.

11. The apparatus of claim 1 wherein a pair of vertically arranged lens systems are positioned adjacent said exit faces for focusing said rays transmitted therethrough onto said film.

12. The apparatus of claim 11 wherein means are provided for rotating said lens systems relative to said exit faces to provide convergence control.

13. The apparatus of claim 11 wherein means are provided for moving said prisms toward and away from said lens systems to provide focus control.

14. The apparatus of claim 11 further provided with means cooperating with and positioned in front of said entrance faces of said prisms a sufficient distance to cause said lens systems to project images of said means onto said film, said means limiting the field of view of said lens systems and establishing a clean line of demarcation between said right and left eye images on said film.

15. The apparatus of claim 14 wherein said means positioned in front of said optical means comprises horizontally arranged mattes.

16. The apparatus of claim 15 wherein said mattes are vertically adjustable.

17. The apparatus of claim 14 wherein said film is 35 millimeter film and each of said images has a vertical height of 0.375 inch.

18. An attachment for a conventional motion picture camera having a lens opening and a focus control for photographing stereoscopic images in vertical relationship on the film in said camera comprising:
  a first housing fixedly mounted in said lens opening of said camera;
  a second housing telescopically mounted in said first housing for movement relative thereto;
  first and second wide angle prisms mounted in said second housing, each of said prisms having an entrance face and an exit face, said prisms being constructed such that their entrance faces are in horizontal side-by-side relationship and their exit faces are in vertically aligned relationship;
  a third housing mounted on said second housing for rotational movement therewith;
  first and second lens systems mounted in said third housing adjacent the exit faces of said first and second prisms and optically aligned therewith for projecting rays passing through said exit faces onto said film;
  means for moving said second housing relative to said first housing whereby the focus of said camera can be changed;
  means for rotating said third housing relative to said second housing whereby the convergence of said rays from said exit faces can be changed; and
  means for changing the apertures of said lens systems, said means comprising a plate having a plurality of sets of different size openings therein, means for moving said plate whereby a selected set of openings are moved into optical alignment with said lens systems, and means coupled to said moving means for actuating said moving means.

19. The apparatus of claim 18 wherein said moving means comprises a first shaft having a shoulder on one end, a gear mounted on said first shaft adjacent the other end thereof, and a rack gear mounted on said plate and cooperating with said gear; and wherein said actuating means comprises a second shaft having a shoulder for cooperating with the shoulder of said first shaft to rotate said first shaft upon rotation of said second shaft, universal drive means for rotating said second shaft, and dial means for driving said universal drive means; and wherein means are provided for assuring that said selected set of openings are in optical alignment with said lens systems, said means comprising:
  a plate mounted on said shaft and having a plurality of flat sides, each side corresponding to one of said sets, cam means engaging said plate, and spring means biasing said cam means against said plate, rotation of said first shaft causing said plate to be rotating beyond the central position between two adjacent sides, said cam means causing said plate and said first shaft to continue to rotate until the next side of said plate is flat against said cam means.

20. The apparatus of claim 18 wherein means are positioned in front of said second housing to limit the field of view of each of said lens systems so that no overlapping of the images formed thereby occurs on said film.

21. The apparatus of claim 20 wherein said positioned means comprises first and second mattes and means horizontally mounting said mattes in front of said prisms and permitting the vertical adjustment of said mattes to limit the field of view of said entrance faces of said lens systems to that which will provide said images on said film with a height equal to one-half the frame height of said film.

22. An attachment for a conventional motion picture camera having a lens opening and a focus control for photographing stereoscopic images in vertical relationship on the film in said camera comprising:
  a first housing fixedly mounted in said lens opening of said camera;
  a second housing telescopically mounted in said first housing for movement relative thereto;
  first and second wide angle prisms mounted in said second housing, each of said prisms having an entrance face and an exit face, said prisms being constructed such that their entrance faces are in horizontal side-by-side relationship and their exit faces are in vertically aligned relationship;
  each of said prisms being identical, said second prism being inverted relative to said first prism, said first prism having a first reflecting surface for receiving rays from said entrance face thereof and transmitting them backwardly and upwardly and a second reflecting surface parallel to said first reflecting surface for receiving rays therefrom and transmitting them backwardly through said exit face; said second prism having a first reflecting surface for receiving rays from said entrance face thereof and transmitting them backwardly and downwardly and a second reflecting surface parallel to said first reflecting surface receiving rays therefrom and transmitting them backwardly through said exit face; said first prism having a shoulder formed therein under said second reflecting surface and said second prism having a shoulder formed therein over said second reflecting surface, said shoulders abutting to position said exit faces of said prisms one above the other and the entrance faces of said prisms side-by-side horizontally;
  a third housing mounted on said second housing for rotational movement therewith;
  first and second lens systems mounted in said third housing adjacent the exit faces of said first and second prisms and optically aligned therewith for projecting rays passing through said exit faces onto said film;
  means for moving said second housing relative to said first housing whereby the focus of said camera can be changed; and
  means for rotating said third housing relative to said second housing whereby the convergence of said rays from said exit faces can be changed.

23. The apparatus of claim 22 wherein in each of said prisms the exit face is perpendicular to the axis of said rays, said second reflecting surface intersects said exit face at an angle such that substantially all rays transmitted to said second reflecting surface are reflected through said exit face, said second surface terminating in a third surface diverging therefrom; the first reflecting surface intersects said entrance face at an angle such that substantially all rays passing through said entrance face are reflected by said first surface toward said second surface, the distance between said first and second surfaces being sufficient to insure that substantially all rays reflected by said first surface are reflected onto said second surface.

24. The apparatus of claim 23 wherein said second reflecting surface intersects said exit face at an angle of substantially 65° and at a distance of 0.1875 inch from the axis of said rays passing through said exit face, said first reflecting surface is at a distance of 0.7343 inch from said second reflecting surface measured perpendicularly therefrom, said entrance face is perpendicular to said exit face and spaced 4.125 inches therefrom, and said plane containing said axial ray is at an angle with the horizontal plane of 8°5'52".

(References on following page)

References Cited

UNITED STATES PATENTS

| | | | |
|---|---|---|---|
| 1,262,954 | 4/1918 | Ives | 352—83 |
| 2,403,733 | 7/1946 | Mainardi et al. | |
| 1,468,091 | 9/1923 | Thalhammer | 352—91 |
| 1,964,968 | 7/1934 | Warmisham | 352—60 |
| 2,240,728 | 5/1941 | Vierling et al. | |
| 2,505,990 | 5/1950 | Pollock | 352—90 |
| 2,554,532 | 5/1951 | Juillet | 352—42 |
| 2,784,645 | 3/1957 | Grey | 350—130 |
| 3,189,915 | 6/1965 | Tondreau | 352—60 |
| 3,363,966 | 1/1968 | Hoch. | |

NORTON ANSHER, Primary Examiner

M. H. HAYES, Assistant Examiner

U.S. Cl. X.R.

350—130; 352—60, 65, 90, 91